US008826761B2

(12) United States Patent
Gumpoltsberger et al.

(10) Patent No.: US 8,826,761 B2
(45) Date of Patent: Sep. 9, 2014

(54) SHIFTING ELEMENT COMPRISING AT LEAST THREE SHIFT POSITIONS FOR SHIFTING TWO GEAR RATIOS

(75) Inventors: Gerhard Gumpoltsberger, Friedrichshafen (DE); Manuel Goetz, Ravensburg (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 134 days.

(21) Appl. No.: 12/670,945

(22) PCT Filed: Jul. 28, 2008

(86) PCT No.: PCT/EP2008/059859
§ 371 (c)(1),
(2), (4) Date: Jan. 27, 2010

(87) PCT Pub. No.: WO2009/027162
PCT Pub. Date: Mar. 5, 2009

(65) Prior Publication Data
US 2010/0199799 A1     Aug. 12, 2010

(30) Foreign Application Priority Data

Aug. 24, 2007   (DE) .......................... 10 2007 040 040

(51) Int. Cl.
*F16D 21/04*     (2006.01)
(52) U.S. Cl.
CPC ...................................... *F16D 21/04* (2013.01)
USPC ............................................. 74/340; 74/330

(58) Field of Classification Search
CPC ....................................................... F16D 21/04
USPC ............................................ 74/340, 339, 330
See application file for complete search history.

(56) References Cited

U.S. PATENT DOCUMENTS

| | | | |
|---|---|---|---|
| 3,333,661 A | 8/1967 | Pawlina et al. | |
| 4,111,288 A | 9/1978 | Fogelberg | |
| 4,194,410 A * | 3/1980 | Richards | 74/339 |
| 4,303,151 A | 12/1981 | Kolacz | |
| 4,565,102 A | 1/1986 | Miyahara et al. | |
| 5,363,712 A | 11/1994 | Muller | |
| 5,365,800 A | 11/1994 | Muller | |
| 5,517,876 A * | 5/1996 | Genise et al. | 74/473.24 |
| 5,921,136 A | 7/1999 | Fuchs | |
| 7,377,191 B2 | 5/2008 | Gitt | |
| 7,824,306 B2 * | 11/2010 | Laeuffer | 477/3 |
| 2007/0284179 A1 | 12/2007 | Laeuffer | |

FOREIGN PATENT DOCUMENTS

| | | |
|---|---|---|
| DE | 32 33 931 A1 | 3/1983 |
| DE | 41 06 503 C1 | 8/1992 |
| DE | 41 09 832 A1 | 10/1992 |
| DE | 42 05 670 C1 | 6/1993 |
| DE | 42 05 671 A1 | 8/1993 |

(Continued)

*Primary Examiner* — Troy Chambers
*Assistant Examiner* — Gregory Prather
(74) *Attorney, Agent, or Firm* — Davis & Bujold, PLLC; Michael J. Bujold (57) ABSTRACT

A shift element comprising at least three shift positions for shifting two gear transmission ratios in which in a first end position, which corresponds to a first shift position, the first gear transmission ratio is engaged and in a second end position, which corresponds to a second shift position, the second gear transmission ratio is engaged, while in the central position, which corresponds to a third shift position, both gear transmission ratios are engaged.

6 Claims, 6 Drawing Sheets

(56) References Cited

FOREIGN PATENT DOCUMENTS

| DE | 195 05 323 C1 | 4/1996 |
| DE | 695 16 766 T2 | 12/2000 |
| DE | 102 32 831 A1 | 2/2004 |
| DE | 102 32 835 A1 | 2/2004 |
| DE | 103 08 797 A1 | 6/2004 |
| DE | 103 39 758 A1 | 6/2005 |
| FR | 2 875 183 A1 | 3/2006 |
| FR | 2 875 280 A1 | 3/2006 |
| FR | 2875183 * | 3/2006 ............... B60K 6/04 |

* cited by examiner

SHIFTING ELEMENT COMPRISING AT LEAST THREE SHIFT POSITIONS FOR SHIFTING TWO GEAR RATIOS

This application is a National Stage completion of PCT/EP2008/059859 filed Jul. 28, 2008, which claims priority from German patent application serial no. 10 2007 040 040.5 filed Aug. 24, 2007.

FIELD OF THE INVENTION

The present invention relates to a shift element with at least three shift positions for shifting two transmission gear ratios.

BACKGROUND OF THE INVENTION

In manual shift transmissions, automated manual shift transmissions and dual-clutch transmissions, according to the prior art gears are engaged or preselected by means of conventional claw elements or synchronizers. In such cases, when two gear transmission ratios are adjacent and on one shaft, depending on the position of the shift actuation element one or the other of these two adjacent transmission ratios can be engaged or coupled to the shaft, or in the neutral position of the shift actuation element both gear transmission ratios can be disengaged.

In some transmission designs, for example dual-clutch transmissions, owing to the arrangement of the transmission ratios it is necessary, when the shift actuation element is in a neutral position, for the two adjacent gear transmission ratios on one shaft both to be shifted to be able to preselect a gear, because of the design. For such transmission designs conventional synchronizers and claw-type shift elements cannot be used, since with such elements the shifting sleeve can always engage only one gear and in the neutral position both gears are disengaged. Below, examples of such transmission designs are described briefly.

For example, a transmission of the type is known from DE 10232831 A1 by the present applicant. The known dual-clutch transmission, which has a countershaft structure, comprises a driveshaft which can be coupled, via a first clutch, to a shaft of a first part-transmission and, via a second clutch, to a shaft of a second part-transmission, the part-transmissions respectively providing different transmission ratios by means of auxiliary transmissions which can be activated by synchronizers. In this case, for synchronization of a shift element of the respective first auxiliary transmission the corresponding clutch of each part-transmission can be actuated appropriately; in addition, for each part-transmission at least one synchronization clutch is provided.

From DE 10232835 A1 by the present applicant a dual-clutch transmission for a motor vehicle is known, which comprises at least two transmission groups with shafts, shift elements and gearwheels, such that the transmission groups can be connected in the force flow to a common driveshaft by means of shift-under-load clutches associated with the transmission groups. In this known transmission each transmission group is so configured that it comprises at least two main branches, and the main branches of each transmission group have gearsets downstream from them via which, by means of shift elements, a connection can be formed to a common output gearwheel of a drive output shaft.

Furthermore, from DE 3233931 C2 a power take-off for a transmission with an incorporated dual clutch is known, such that the power take-off comprises a first transmission mechanism connected or locked to the main take-off shaft and a second transmission mechanism locked or connected to the main running shaft as well as a clutch device, which works in such manner that the transmission mechanisms can be selectively coupled in driving connection with the take-off transmission shaft.

SUMMARY OF THE INVENTION

The purpose of the present invention is to provide a shift element with at least three shift positions for shifting two transmission gear ratios, in which, in a first axial end-position, which is a first shift position, the first transmission gear ratio is shifted and in a second axial end-position, which is a second shift position, the second transmission ratio is shifted, by the use of which two adjacent transmission gear ratios on one shaft can be shifted at the same time. The shift element according to the invention should in particular be suitable for dual-clutch transmissions, dual-clutch transmissions of group configuration and planetary transmissions, and should be able to be combined with both synchronizers and claw-type shift elements. In addition, its structure should be compact.

According to the claims a shift element is proposed, which has at least three shift positions for shifting two transmission gear ratios, with which, in a first-end position corresponding to a first shift position the first transmission ratio is engaged and in a second end-position corresponding to a second shift position the second transmission ratio is engaged, while in the central position corresponding to a third shift position both transmission ratios are engaged.

In a first embodiment of the invention a shift element derived from a conventional synchronizer device or from a conventional claw-type shift element with no synchronizer device is proposed, in which the axial length of the shifting sleeve is modified in such manner that in the neutral position of the shifting sleeve its inner claw teeth engage simultaneously in the outer claw teeth of the clutch elements of both transmission gear ratios.

With a shift element of such design, when one gear is disengaged and at the same time another gear is engaged, displacement of the shifting sleeve into the torque-loaded claw teeth is necessary, but this requires high actuator forces.

In a second embodiment of the invention a shift element derived from a conventional synchronizer device or from a conventional claw-type shift element with no synchronizer device is proposed, which comprises a shifting sleeve divided into two halves or parts so that only half or part of the shifting sleeve has to be moved, by which the associated gear is to be disengaged or engaged. The other shifting sleeve half of the engaged and thus torque-delivering gear remains untouched.

According to the invention, the shift actuator has three positions in the conventional manner, such that the movement of the two shifting sleeve halves is independent so that depending on the position and movement direction of the shift actuator either one or the other shifting sleeve half is moved. The gear associated with the respective shifting sleeve half is disengaged by a positively locking carrier element on the receptor of the shift actuator, so that decoupling and coupling of the shifting sleeve halves during the shifting or engagement and synchronization of a gear take place in the shift actuator receptor.

Advantageously, conventional claw teeth can be used on synchronizer elements (if provided), clutch elements, synchronizer rings (if provided) and sliding sleeve halves.

By virtue of the design concept according to the invention a compact shift element is obtained, which fulfills the above-mentioned requirements regarding the simultaneous shifting of two gears and the alternate disengagement and re-engagement of a respective gear. In that the claw teeth of the components can be adopted as they exist, only the design of the sliding sleeve and its connection to the shift actuator receptor are modified.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

The description below is given with reference to shift elements derived from conventional synchronizer devices; as already explained, however, it is also possible to derive the shift element according to the invention from a conventional claw-type shift element with no synchronizer device, and in that case the functions of the synchronizer element that are relevant for the invention are assumed by a part of the claw shift element arranged fixed on a shaft.

Figure 1:
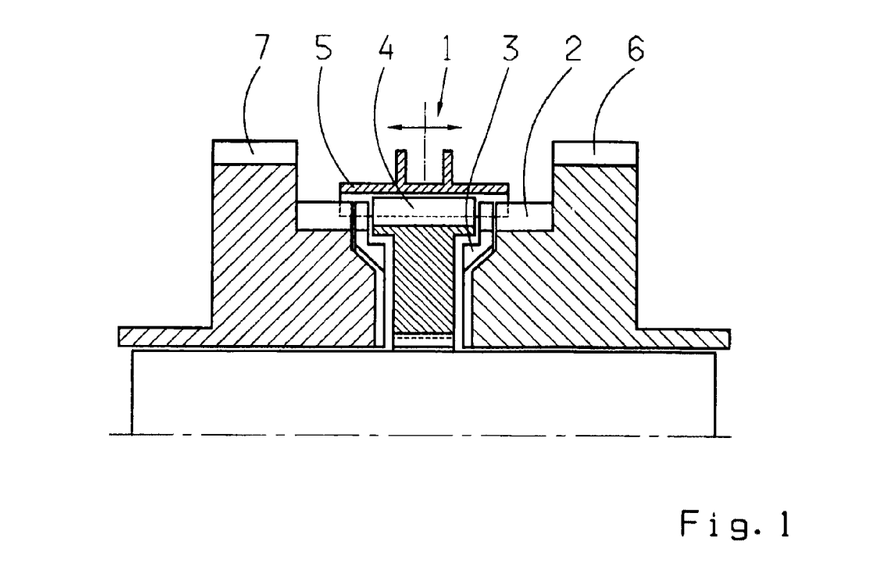
FIG. 1: Schematic sectioned view of a shift element designed in accordance with a first embodiment of the invention.

In a first embodiment of the invention as shown in FIG. 1, the shift element 1 is in the form of a conventional synchronizer device comprising clutch elements 2, synchronizing rings 3 and a synchronizer element 4, in which the axial length of the shifting sleeve 5 is modified such that in the central position of the shifting sleeve 5 its inner claw teeth engage simultaneously in the outer claw teeth of the clutch elements 2 of both adjacent transmission gear ratios or gearwheels 6, 7 arranged on one shaft. In contrast to a conventional synchronizer, in the central position of the shift element according to the invention both gears are engaged, as can also been seen in FIG. 13 in which the shift element in FIG. 1 is denoted as alternative 1.

Figure 2:
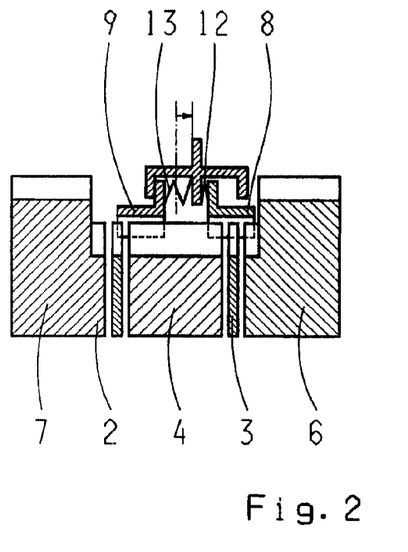
FIGS. 2 and 2A: Schematic sectioned views of a shift element designed in accordance with a second embodiment of the invention, in the central position with a disengaged gear.
Figure 2A:
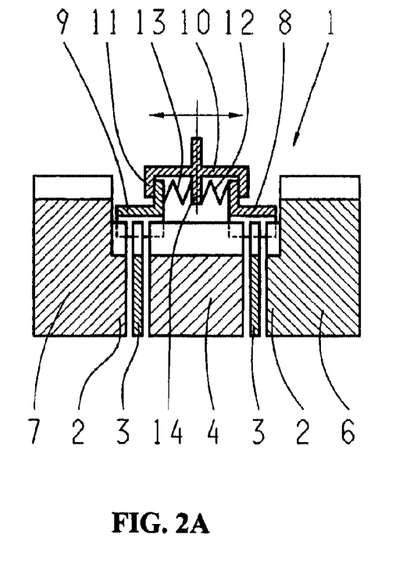

In the embodiment shown in FIGS. 2 and 2A the shifting sleeve of the shift element 1 is divided and so has two shifting sleeve halves 8, 9. In the figure the shift actuator receptor 10, which forms the connecting member of the shift element 1 to the shift actuator and comprises a positively locking carrier element 11 for the shifting sleeve halves 8, 9, is represented schematically. The shift actuator receptor 10 has a carrier 14 positioned centrally and the carrier elements 11 located at axially opposite sides of the shift actuator receptor.

According to the invention, axially acting spring elements 12, 13 are positioned on the inside of the shift actuator receptor 10 between the central carrier 14 of the shift actuator receptor 10 and the inside end faces of the two shifting sleeve halves 8, 9. When, now, the left-hand gear is disengaged, the shift actuator receptor 10 is moved to the right shift position (axial end position), although it takes the left shifting sleeve half 9 with it by means of the carrier element 11, but the right shifting sleeve half 8 is stationary, to accommodate the movement of the shift actuator receptor 10 to the right shift position, the spring 12 on the right is compressed. During this the spring force applied on the shifting sleeve half 8 can be supported against a retaining ring or on the gearwheel which stops movement of the shift actuator receptor to the right via the stationary shifting sleeve half 8 when the shift actuator receptor is in the right shift position (axial end position) as shown in FIG. 2. According to the invention, the spring elements 12, 13 are designed such that the spring force is at least as large as the force required to synchronize and engage the claw teeth.

In FIG. 2A the shift actuator is in its central position so that both gears are engaged. Thus, the inner claw teeth of the two shifting sleeve halves 8, 9 engage both in the claw teeth on the synchronizer element 4 and in the claw teeth on each of the clutch elements.

The mode of operation of the shift element shown will be explained below, considering the example of "disengaging the gear on the left and re-engaging it". Starting from the neutral position, to disengage the gear on the left the shift actuator is moved to the right so that the carrier element 11 of the shift actuator receptor 10 carries with it the shifting sleeve half 9 on the left to be shifted and pushes it to the right, so that the claw teeth of the left-hand clutch element are now no longer engaged with the inner claw teeth of the left shifting sleeve half 9 as illustrated in FIG. 2. As can be seen in the figure, the position of the right shifting sleeve half 8 remains unchanged (i.e. the right-hand gear remains engaged) because of the compression of the spring 12.

To re-engage the gear on the left, the shift actuator receptor 10 is now moved to the left again, i.e. back to its central position. During this the left shifting sleeve half 9 is pushed to the left by the force of the left spring 13.

Figure 13:
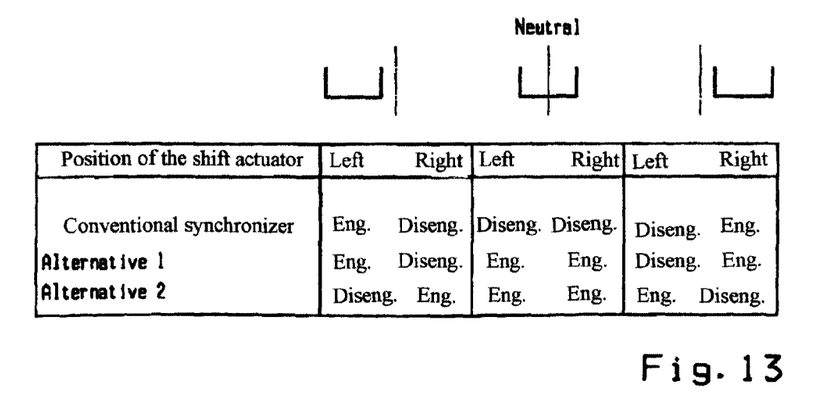
FIG. 13: An overview of the functionality of a conventional synchronizer and the synchronizer concept proposed according to the invention.

In contrast to a conventional synchronizer, in the central position of the shift element according to the invention both gears are engaged, as also illustrated in FIG. 13 in which the shift element shown in FIGS. 2 and 2A is denoted as alternative 1.

FIGS. 3, 3A, 3B and 3C show a further embodiment of a shift element according to the invention, in which the shifting sleeve is also divided into two shifting sleeve halves 8, 9. In this design as well the shifting sleeve halves 8, 9 are moved by a carrier element 11 of the shift actuator receptor 10, but to prevent the conjoint movement of the other shifting sleeve half the shift actuator receptor 10 has on its side facing toward the shifting sleeve halves 8, 9 two grooves 15, 16 into which a displacement element 17 can be pressed.

In addition the inner end faces of the shifting sleeve halves 8, 9 have chamfers 18 over which the displacement element 17 can be pressed into one of the two grooves 15, 16 when the shift actuator receptor is actuated; in the neutral position (FIG. 3C) the displacement element 17 is positioned between the two inner end faces of the shifting sleeve halves 8, 9.

Figure 3:
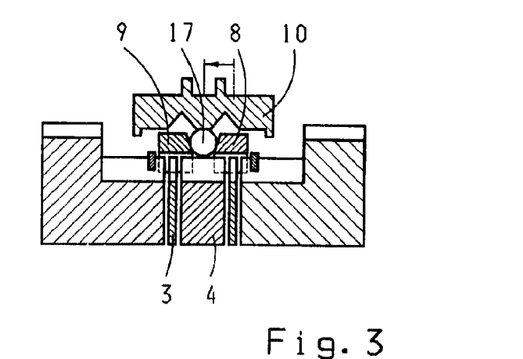
FIGS. 3-3C: Four schematic sectioned views of a shift element according to a third embodiment of the invention, to illustrate the individual shift operations.
Figure 3A:
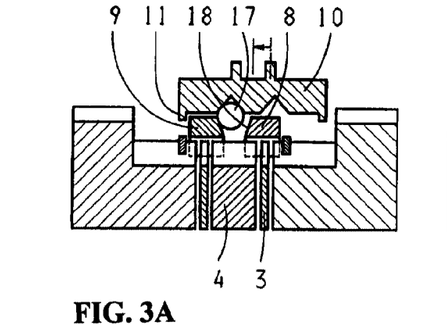
Figure 3B:
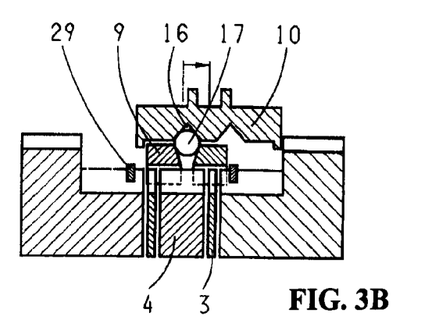

When the left-hand gear is disengaged, due to the movement of the left shifting sleeve half 9 to the right by the chamfers 18 on the inside end faces of the shifting sleeve halves 8, 9 the displacement element 17, which is preferably a ball, is pressed upward into a correspondingly shaped groove 16 in the shift actuator receptor 10, as illustrated in FIG. 3B. During this the right-hand shifting sleeve half 8 takes up the supporting force of the ball 17 and can rest against a retaining ring 29 or alternatively directly on the gearwheel 6.

When, now, the left gear is to be re-engaged, as shown in FIG. 3A the shift actuator receptor 10 is moved back to its central position again and during this the shifting sleeve half 9 is moved by the ball 17 to the left, the force required for synchronization and engagement being transmitted, according to the invention, by the ball 17. On completion of the synchronization process the ball 17 is pressed back to its original position between the shifting sleeve halves 8, 9 (bottom right figure), which can be done by a spring force acting radially inward, while the simultaneous pressure on the ball 17 by the oblique faces in the groove 16 of the shift actuator receptor 10 assists this return process of the ball 17. Preferably, the ball 17 is arranged in a spring ring.

Alternatively to the design as a ball, the displacement element may have other shapes. For example, the displacement element can be shaped at the bottom (i.e. on its side facing away from the shift actuator receptor) as a cone and at the top (i.e. on its side facing toward the shift actuator receptor) as a cylinder or a square, and the grooves 15, 16 in the shift actuator receptor 10 are then adapted to match the shape of the displacement element.

Figure 3C:
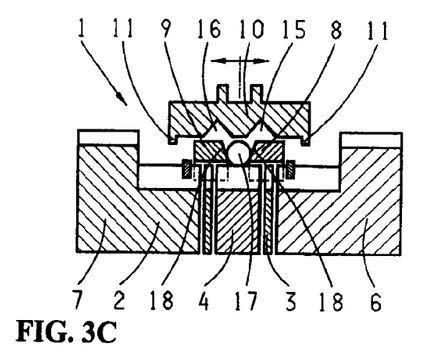

The embodiment shown in FIGS. 3-3C has the advantage of ensuring the best possible interlocking and forced disengagement and engagement processes.

Figure 4:
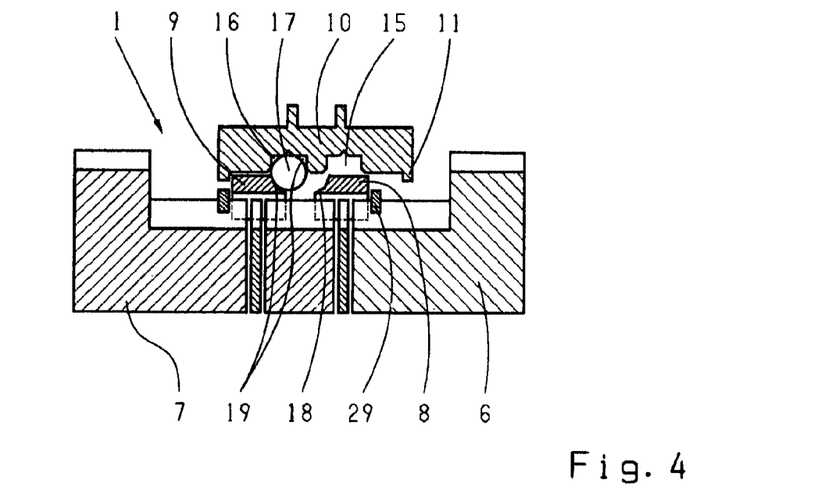
FIG. 4: Schematic view of a further embodiment of the invention.
Figure 5:
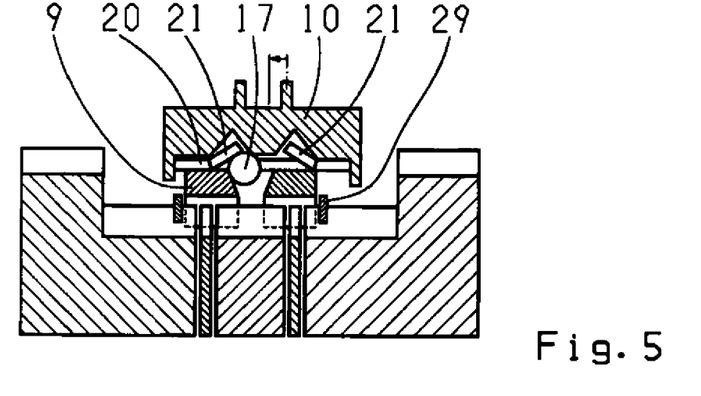
FIG. 5: Schematic view of a further embodiment of the invention.
Figure 6:
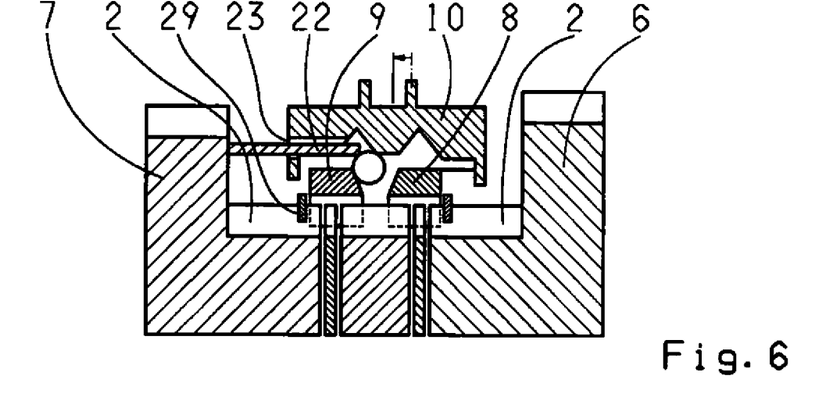
FIG. 6: Schematic view of another design of a shift element according to the invention.

FIGS. 4, 5 and 6 show designs according to the invention of the shift element for the secure return movement of the displacement element 17, even under the influence of centrifugal force.

FIG. 4 shows a possibility for avoiding the sliding of the ball 17 along the chamfers of the shifting sleeve halves 8, 9 and the respective groove 15, 16 in the shift actuator receptor 10. In this case the ball 17 is held in furrows 19 in the chamfers 18 of the shifting sleeve halves 8, 9 and the grooves 15, 16 in the shift actuator receptor 10 during the process of pressing back in or synchronization. This has the advantage that during synchronization a solid movement of the unit consisting of the shift actuator receptor/ball/shifting sleeve half occurs, which prevents sliding of the ball 17 along the oblique surfaces or chamfers 18.

The ball 17 must then be moved back into the space between the shifting sleeve halves 8, 9, and this can be done for example by a ball/sprung joint ring such that the spring action pulls the ball 17 radially inward.

Alternatively, as shown in FIG. 5, a spring leaf 20 with spring strips 21 can be inserted or arranged on the inside of the shift actuator receptor 10. According to the invention the leaf 20 is secured against axial movement relative to the shift actuator receptor 10 by its contact on both sides against the inner sides of the carrier elements 11 of the shift actuator receptor 10.

When a ball or some other displacement element 17 moves radially into one of the grooves 15, 16 in the shift actuator receptor 10 (i.e. when a gear is disengaged), spring strips 21 on the spring leaf 20 are prestressed, and during the subsequent return and engagement of the gear these press the balls or displacement elements back again into the space between the shifting sleeve 8, 9, while the sloping surfaces on the respective groove 15, 16 in the shift actuator receptor 10, in passing across the balls or other displacement elements, additionally press them radially inward.

FIG. 6 illustrates a further principle according to the invention for returning the ball or displacement element. In this case ejector teeth of an ejector tooth array 22 are arranged on the face of the gearwheels 6, 7 or on the clutch elements 2, so that for example when the shift actuator receptor 10 is moved to the left in the central position, beyond a certain axial position of the shift actuator receptor 10 the teeth of the ejector tooth array 22 project into the shift actuator receptor 10 through apertures 23 provided for the purpose and so force the displacement element 17 to move radially inward and thus into the space between the shifting sleeve halves 8, 9.

Figure 7:
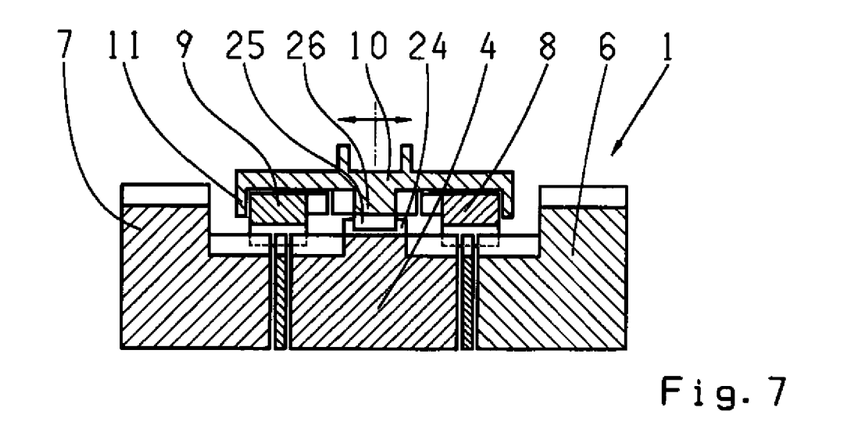
FIG. 7: Schematic view of another design of a shift element according to the invention.

FIG. 7 shows a shift element 1 made according to the invention, in which in order to avoid conjoint movement of the respective other shifting sleeve half 8 or 9 during a shift operation, a twisting motion is superimposed on the axial movement of the shift actuator receptor 10. The twisting motion of the shift actuator receptor 10 is produced by means of oblique teeth 24 on the synchronizer element 4, in which inner oblique teeth 25 of the shift actuator receptor 10 engage. The shift actuator is II-shaped and has a centrally positioned carrier 26 with the inner oblique teeth 25, while its flanks form the carrier elements 11. In the case when the shift element is configured as a claw-type shift element with no synchronizer rings, the oblique teeth 24 are located on part of the claw shift element that is fixed on the shaft.

Figure 8:
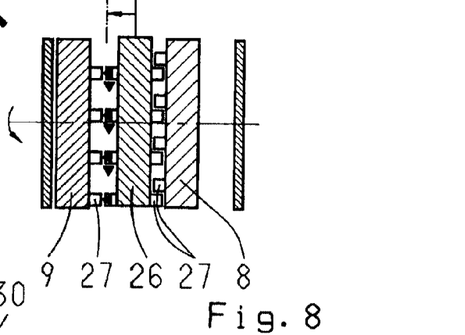
FIGS. 8-8B: Schematic views of the shift element according to the invention shown in FIG. 7, to illustrate the re-engagement and synchronization of the disengaged gear by overlapping rotation movements.
Figure 8A:
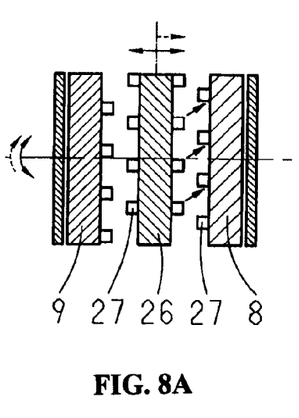
Figure 8B:
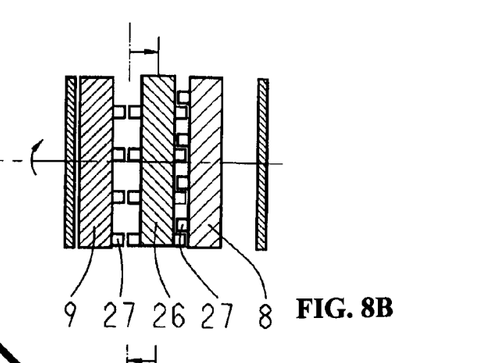

The operation of the shift element shown in FIG. 7 is explained below with reference to FIGS. 8A and 8B, considering the example "disengage and re-engage the gear on the left".

A gear is disengaged by the carrier elements 11 on the shift actuator receptor 10. On the faces of the shifting sleeve halves 8, 9 and on the central carrier 26 of the shift actuator receptor 10 claws 27 are fixed on the surfaces, which in the central position shown in FIG. 8A must have a defined rotation position relative to one another. The representations in FIGS. 8-8B are plan views of the shift element 1, sectioned through the shift actuator receptor 10.

When for example the left-hand gear is disengaged, the carrier element 11 on the shift actuator receptor 10 carries the left-hand shifting sleeve half 9 with it during its movement to the right. During this, the shift actuator receptor 10 is at the same time rotated relative to the synchronizer element 4 and the shifting sleeve halves 8, 9, so that the angular position of the claws 27 relative to one another changes.

In the example shown, to release the axial path the claws 27 on the right-hand side of the carrier 26 of the shift actuator receptor 10 come to rest directly next to the claws of the right-hand shifting sleeve half 8 (FIG. 8B), i.e. the axial distance between the shift actuator receptor 10 and the right-hand shifting sleeve half 8 (i.e. the one which is not to be shifted) has decreased (the right-hand shifting sleeve half has not been moved as well).

The axial distance between the carrier 26 of the shift actuator receptor 10 and the left-hand shifting sleeve half 9 has not changed, but the angular position of the claws 27 of the two components 9, 26 has. In particular (see FIG. 8B) the claws 27 on the left side of the carrier 26 of the shift actuator receptor 10 rest directly against the ends of the claws 27 on the left shifting sleeve half 9.

When the gear on the left is to be re-engaged, as the shift actuator receptor 10 moves to the left (i.e. back to its central position) the claws 27 on the left of its carrier 26 press against the face of the left shifting sleeve half 9 to push it back toward the left into its initial position and thereby to synchronize and engage the gear (FIG. 8). During this pushing movement a relative sliding movement on the end faces of the claws 27 takes place due to the rotation, so that at the end of the pushing movement the claws 27 are once again in their initial position shown in FIG. 8A.

Figure 9:
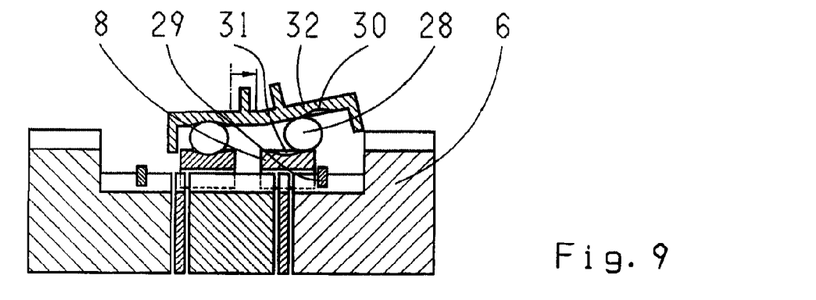
FIGS. 9 and 9A: Schematic views of another design of a shift element according to the invention.
Figure 9A:
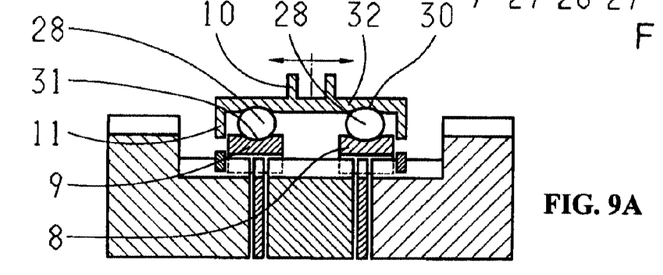

In the example shown in FIGS. 9 and 9A too, a gear is disengaged by the axial movement of the carrier element 11 on the shift actuator receptor 10. In this case the shift actuator receptor 10 is made radially springy, having strips 32 that spring out radially arranged at its circumference which can move radially outward when the shift actuator receptor 10 moves across whichever of the shifting sleeve halves remains stationary.

This outward movement is accompanied by the rolling of balls 28 fitted into corresponding grooves 30, 31 in the springy strips in the shift actuator receptor and in the shifting sleeve halves 8, 9. In FIG. 9A the shift element according to the invention is shown in its central position.

When the left-hand gear is disengaged (FIG. 9) the shift actuator receptor 10 is moved to the right and the balls 28 on the right side (i.e. the balls associated with the shifting sleeve half that is not to be shifted), on the one hand in the grooves 30 in the shift actuator receptor 10 and on the other hand in the grooves 31 of the shifting sleeve half 8 on the right, roll to the right, and at the same time move radially outward due to the special contour of the grooves 30, 31.

Owing to this radial movement and to the springy strips 32 attached at its periphery the shift actuator receptor 10 bends outward, which means that the right-hand shifting sleeve half 9 does not move as well. During this, the spring force acting via the balls 28 on the right-hand shifting sleeve 8 (i.e. the one not being shifted) is supported, according to the invention, on a retaining ring 29 or alternatively on the gearwheel 6.

When, now, the left-hand gear is re-engaged, as the shift actuator receptor 10 moves back to its central position it carries the balls 28 on the left and so also the left-hand shifting sleeve half 8 with it toward the left, whereby the left gear can be synchronized and re-engaged. Owing to the contour of the grooves, the right-hand shifting sleeve half 8 does not move as well even though the balls on the right move back to their initial position. In this case the spring force in the springy strips 32 of the shift actuator receptor 10 is designed to be large enough to hold the balls 28 securely in the grooves 30, 31 during the synchronization and engagement of the gear.

Figure 10:
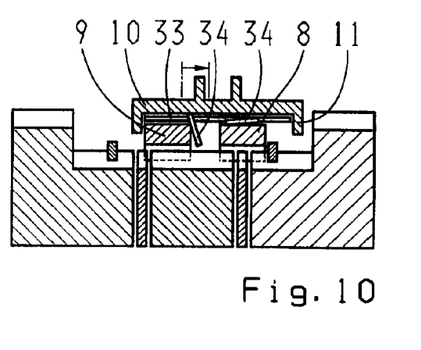
FIGS. 10 and 10A: Schematic views of a further, advantageous design of a shift element according to the invention.
Figure 10A:
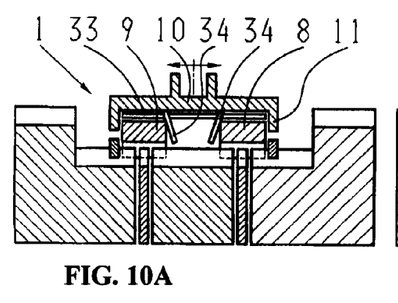

A further advantageous embodiment of the invention is the object of FIGS. 10 and 10A. This shift actuator receptor 10 is again II-shaped and its flanks form the carrier elements 11.

In this case, on the inside of the shift actuator receptor 10 is inserted a sheet 33 of spring steel with springy strips 34 projecting radially inward, which, when the shift element 1 is in its central position, rest against the inner end faces of the shifting sleeve halves 8, 9 (FIG. 10A). The springy strips 34 can in each case pivot in only one direction, namely toward the carrier element 11 for the shifting sleeve half associated with the springy strip 34 concerned. According to the invention, the sheet 33 is secured against axial movement relative to the shift actuator receptor 10 by its contact on both sides against the inner sides of the carrier elements 11 of the shift actuator receptor 10.

Below, the operating mode of the shift element shown in FIGS. 10 and 10A will be described considering the example "disengagement and re-engagement of the gear on the left". The gear is disengaged by axial movement of the carrier elements 11 of the shift actuator receptor 10. When, now, the left-hand gear is disengaged, the springy strip 34 in contact with the inside end face of the shifting sleeve 8 on the right moves (or bends) radially outward over the latter, so that the right shifting sleeve half 8 is not moved along during this. That is illustrated in FIG. 10.

When the gear on the left is re-engaged by a movement of the shifting sleeve holder 10 to the left back to its neutral position, then the shift actuator receptor 10 carries the left-hand shifting sleeve half 9 along with it by virtue of the springy strip 34 bent down and resting against the left shifting sleeve half 9. When the shift actuator receptor 10 has returned to its central position, the springy strip 34 on the right can bend radially inward so that the initial condition is reproduced.

Figure 11:
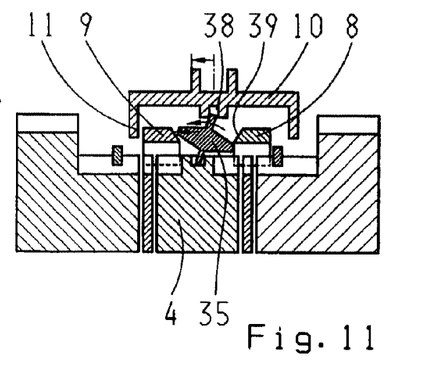
FIGS. 11-11B: Schematic views of another advantageous design of a shift element according to the invention, to illustrate the re-engagement and synchronization of the disengaged gear by the driven motion of adjusting blocks.
Figure 11A:
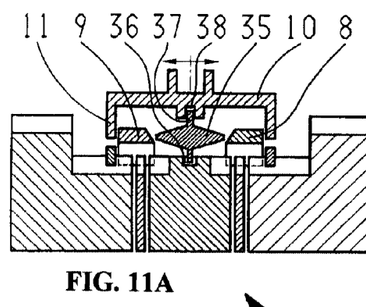
Figure 11B:
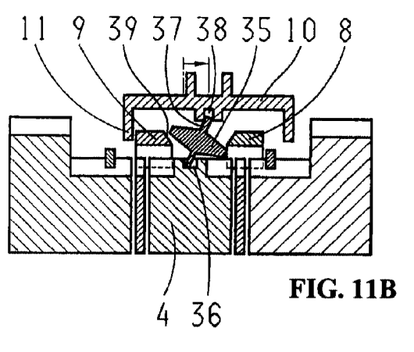

In the shift element shown in FIGS. 11A and 11B the conjoint movement of the torque-transmitting shifting sleeve half is prevented by the tilting of tilt-blocks 35 distributed on the periphery of the synchronizer element 4, which also axially releases the shifting sleeve half to be disengaged. The shift actuator receptor 10 is again II-shaped, and its flanks form the carrier elements 11.

According to the invention, the tilt-blocks 35 are arranged in grooves 36 of the synchronizer element 4 in such manner that when they tilt, the ends of the tilt-blocks 35 pivot radially outward or inward. In addition, on the tilt-blocks 35 are provided carriers 37 which engage in grooves on the inside of the shift actuator receptor 10 so that when the shift actuator receptor 10 moves, the tilt-blocks 35 can pivot about their bearing-point in the synchronizer element 4. In the central position the grooves 36 and the grooves 38 are positioned one above the other. In the case when the shift element is configured as a claw-type shift element without synchronizer rings, the grooves 36 are made in a component of the claw shift element arranged fixed on the shaft.

Below, the operating mode of the shift element shown in FIGS. 11-11B will be explained considering the example "disengagement and re-engagement of the gear on the left". The gear is disengaged by moving the carrier elements 11 of the shift actuator receptor 10 axially. The image in FIG. 11A shows the shift actuator receptor 10 in its central position.

When, now, the left-hand gear is to be disengaged, as the left shifting sleeve half 9 is moved by the carrier element 11 on the shift actuator receptor 10 at the same time the tilt-blocks 35 also pivot. According to the invention, this pivoting process clears an axial path for the left shifting sleeve half 9 to be moved; it can now be disengaged without the tilt-blocks 35 blocking its path. Since the torque-transmitting shifting sleeve half 8 on the right does not move so that its distance from the pivot-point of the tilt-blocks 35 does not change, the right-hand portion of the tilt-blocks 35 can pivot radially inward past the right shifting sleeve half 8 without impediment, as shown in FIG. 11B.

If, now, the left-hand gear is to be re-engaged, as shown in FIG. 11 the shift actuator receptor 10 is moved back to its central position so that the tilt-blocks 35 pivot back to their initial position. However, during this pivoting of the tilt-block 35 they come in contact with the disengaged, left-hand shifting sleeve half 9. As the shift actuator receptor 10 moves farther to the left, the returning tilt-blocks 35 push the left shifting sleeve half 9 to the left, so synchronizing and engaging the left-hand gear. Preferably, the inner end faces of the shifting sleeve halves 8, 9 have chamfers 39 to facilitate the contact conditions.

Figure 12:
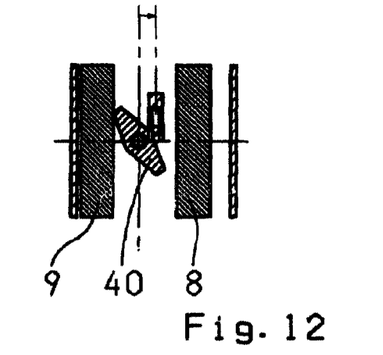
FIGS. 12-12C: Schematic views of an alternative embodiment of the shift element shown in FIG. 11, to illustrate the re-engagement and synchronization of the disengaged gear.
Figure 12A:
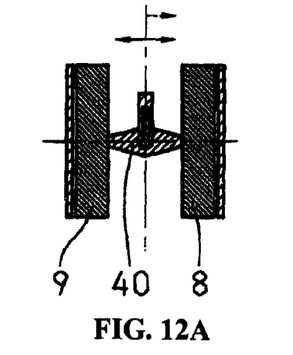
Figure 12B:
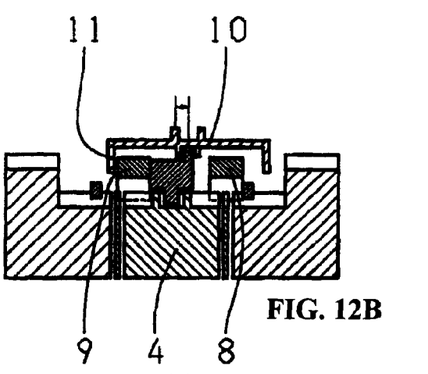
Figure 12C:
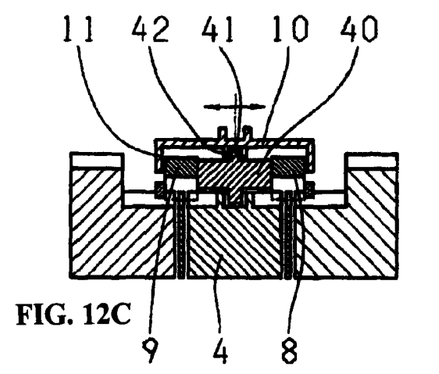

Another example of a shift element 1 according to the invention is the object of FIGS. 12A, 12B and 12C. In this case, analogously to the example embodiment shown in FIGS. 11-11B, the conjoint movement of the torque-transmitting shifting sleeve half is prevented in that pivoting elements 40 are provided, which are rotated to clear an axial path for the shifting sleeve half to be disengaged. In contrast to the example embodiment according to FIGS. 11-11B, the rotation axes of the pivoting elements 40 extend radially outward, i.e. the rotation planes of the pivoting elements 40 are tangential to the periphery of the synchronizer element 4; according to the invention, the pivoting elements 40 are mounted to rotate in the synchronizer element 4. In the case that the shift element is configured as a claw-type shift element without synchronizer rings, the pivoting elements 40 are mounted on a part of the claw shift element arranged fixed on the shaft.

FIGS. 12A and 12C show, respectively a sectioned view and a plan view of a section through the shift actuator receptor 10 of the shift element in its central position; FIGS. 12 and 12B show, respectively, a sectioned view and a plan view of a section through the shift actuator receptor 10 when the left-hand gear has been disengaged.

When the shift actuator receptor 10 moves to the right, the left shifting sleeve half 9 is carried with it by the left-hand carrier element 11 on the shift actuator receptor 10, so that the pivoting elements 40, which engage by means of carriers 41 in grooves 42 on the inner side of the shift actuator receptor 10, are rotated out of their initial position. This releases an axial path to enable the left-hand shifting sleeve half 9 to be disengaged (FIGS. 12 and 12B).

When the shift actuator receptor 10 moves back to its central position, the pivoting elements 40 too turn back to their starting position and, during this, press on the left shifting sleeve half 9 so as to push it back to the left, whereby the left-hand gear is synchronized and engaged.

Needless to say, any design configuration and in particular any spatial arrangement of the components of the shift element according to the invention, per se and in relation to one another and provided they are technically appropriate, are covered by the protective scope of the present claims, without influencing the function of the shift element as indicated in the claims, even if such configurations are not represented explicitly in the figures or in the description.

INDEXES

1 Shift element
2 Clutch element
3 Synchronizer ring
4 Synchronizer element
5 Shifting sleeve
6 Gearwheel
7 Gearwheel
8 Shifting sleeve half
9 Shifting sleeve half
10 Shift actuator receptor
11 Carrier element
12 Spring element
13 Spring element
14 Carrier of the shift actuator receptor
15 Groove
16 Groove
17 Displacement element
18 Chamfer
19 Furrow
20 Spring sheet
21 Springy strip
22 Ejector teeth
23 Aperture
24 Oblique teeth on the synchronizer element
25 Inner oblique teeth on the shift actuator receptor
26 Carrier of the shift actuator receptor
27 Claw
28 Ball
29 Retaining ring
30 Groove
31 Groove
32 Strip
33 Sheet
34 Springy strip
35 Tilt-block
36 Groove
37 Carrier
38 Groove
39 Chamfer
40 Pivoting element
41 Carrier
42 Groove

The invention claimed is:

1. A shift element comprising a common shift actuator and two shifting sleeve halves, the shift actuator and the two shifting sleeve halves being axially movable with respect to each other, the shift element being shiftable between at least three shift positions for shifting two transmission gears;
first and second channels being formed by the shift actuator, the first and the second channels being axially fixed in relation to each other, the first channel receives a first shifting sleeve half and the second channel receives a second shifting sleeve half;
radially outer exterior teeth of a first transmission gear being engaged, in a first axial end-position of the shift element, by radially inner claw teeth of the first shifting sleeve half, and the first axial end position is a first shift position of the shift actuator;
radially outer exterior teeth of a second transmission gear being engaged, in a second axial end position of the shift element, by radially inner claw teeth of the second shifting sleeve half, and the second axial end position is a second shift position of the shift actuator;
both of the radially outer exterior teeth of the first and the second transmission gears being engaged, in a central position of the shift element, respectively, by the radially inner claw teeth of the first and the second shifting sleeve halves, and in the central position of the shift element, the radially inner claw teeth of the first and the second shifting sleeve halves engage a synchronizer element, and the central position of the shift element corresponds to a third shift position of the shift actuator;
in each of the first and the second axial end positions of the shift actuator, the shift actuator directly contacts only one of the first and the second shifting sleeve halves.

2. The shift element according to claim 1, wherein the shift element comprises a synchronizer device with clutch elements (2), synchronizer rings (3) and the synchronizer element (4), the shift actuator being axially slidable and having first and second carrier elements located at axially opposite ends thereof and a central carrier element axially located between the first and the second carrier elements, the first channel being axially defined by the first carrier element and the central carrier element, and the second channel being axially defined by the central carrier element and the second carrier element, first and second springs, the first spring and the first shifting sleeve half being received within the first channel axially between the central carrier element and the first carrier element such that the first spring biases the first shifting sleeve half toward the first carrier element, and the second spring and the second shifting sleeve half being received within the second channel axially between the central carrier element and the second carrier element such that the second spring biases the second shifting sleeve half toward the second carrier element, in the central position of the shift element, the first and the second springs respectively bias the first and the second shifting sleeve halves such that the radially inner claw teeth of the first shifting sleeve half engages the radially outer exterior teeth of the first transmission gear, radially outer teeth of a first synchronizer ring and radially outer teeth of the synchronizer element and the radially inner claw teeth of the second shifting sleeve half engages the radially outer exterior teeth of the second transmission gear, radially outer teeth of a second synchronizer ring and the radially outer teeth of the synchronizer element, and of the first axial end position, the second axial end position and the central position of the shift element, the first and the second shifting sleeve halves both abut the shift actuator only when the shift element is in the central position.

3. The shift element according to claim 1, further comprising, the shift actuator being shiftable to axial positions from the first axial end position to the second axial end position and axial positions therebetween;

each of the first and the second shifting sleeve halves (8, 9) is couplable with a respective one of the first and the second transmission gears (6, 7);

the first and the second shifting sleeve halves (8, 9) are separately axially movable with respect to one another, such that depending on the axial position and direction of movement of the shift actuator, only one of the first and the second shifting sleeve halves (8, 9) is axially moved by the shift actuator at a time;

in the first axial end-position of the shift element, only the first shifting sleeve half of the first and the second shifting sleeve halves abuts the shift actuator, and in the second axial end-position of the shift element, only the second shifting sleeve half of the first and the second shifting sleeve halves abuts the shift actuator, and in the central position of the shift element, both of the first and the second shifting sleeve halves abut the shift actuator, and the first and the second shifting sleeve halves (8, 9) are biased in axially opposite directions from each other by at least one elastic element located therebetween such that the inner claw teeth of the first and the second shifting sleeve halves (8, 9) engage with radially outer teeth of the synchronizer element, and radially outer claw teeth of clutch elements (2) of a respective one of the first and the second transmission gears (6, 7) which are associated with the first and the second shifting sleeve halves (8, 9).

4. The shift element according to claim 3, wherein the shift actuator comprises a shift actuator receptor (10) having a carrier element (11) for each of the first and the second shifting sleeve halves (8, 9), by which the transmission gear that is couplable with each of the respective shifting sleeve halves is disengaged, and decoupling and coupling of the first and the second shifting sleeve halves (8, 9), when the shift element (1) is shifted, is effected by communication between the shift actuator receptor (10) and the first and the second shifting sleeve halves such that, in the first axial end-position of the shift element, the radially inner claw teeth of the first shifting sleeve half engage the radially outer claw teeth of a first clutch element, radially outer teeth of a first synchronizer ring and the radially outer teeth of the synchronizer element, and the radially inner claw teeth of the second shifting sleeve half engage radially outer teeth of a second synchronizer ring and the radially outer teeth of the synchronizer element, and in the second axial end-position of the shift element, the radially inner claw teeth of the first shifting sleeve half engage radially outer teeth of the first synchronizer ring and the radially outer teeth of the synchronizer element, and the radially inner claw teeth of the second shifting sleeve half engage the radially outer claw teeth of a second clutch element, radially outer teeth of a second synchronizer ring, and the radially outer teeth of the synchronizer element.

5. A shift element comprising a common shift actuator and first and second shifting sleeve halves, the shift actuator and the first and the second shifting sleeve halves being axially movable with respect to each other, the shift actuator being axially shiftable between a first axial end position and a second axial end position for shifting first and second transmission gears, the first axial end position being a position at which axial movement of the shift actuator in one direction is blocked and the second axial end position being a position at which axial movement of the shift actuator in an opposite direction is blocked;

first and second channels being formed by the shift actuator, the first and the second channels being axially fixed in relation to each other, the first channel receives the first shifting sleeve half and the second channel receives the second shifting sleeve half;

in the first axial end position of the shift actuator, inner claw teeth of the first shifting sleeve half engage outer claw teeth of the first transmission gear and the first shifting sleeve half is spaced from the shift actuator and the second shifting sleeve half directly abuts the shift actuator and the inner claw teeth of the second shifting sleeve half are disengaged from outer claw teeth of the second transmission gear;

in the second axial end position of the shift actuator, inner claw teeth of the second shifting sleeve half engage outer claw teeth of the second transmission gear and the second shifting sleeve half is spaced from the shift actuator and the first shifting sleeve half directly abuts the shift actuator and the inner claw teeth of the first shifting sleeve half are disengaged from outer claw teeth of the first transmission gear;

in a third axial position of the shift actuator centrally between the first and the second axial end positions of the shift actuator, both of the first and the second shifting sleeve halves abut the shift actuator, the outer claw teeth of both of the first and the second transmission gears are engaged, respectively, by the inner claw teeth of the first and the second shifting sleeve halves, and the inner claw teeth of the first and the second shifting sleeve halves engage a synchronizer element.

6. A shift element comprising a common shift actuator and two shifting sleeve halves, the shift actuator and the two shifting sleeve halves being axially movable with respect to each other, the shift actuator being shiftable between at least three shift positions for shifting two transmission gears;
- first and second channels being formed by the shift actuator, the first and the second channels being axially fixed in relation to each other, the first channel receives a first shifting sleeve half and the second channel receives a second shifting sleeve half;
- radially outer exterior teeth of a first transmission gear being engaged, in a first end-position of the shift actuator, by radially inner claw teeth of the first shifting sleeve half, and the first end position is a first shift position and is an axial position at which axial movement of the shift actuator in one direction is blocked;
- radially outer exterior teeth of a second transmission gear being engaged, in a second end position of the shift actuator, by radially inner claw teeth of the second shifting sleeve half, and the second end position is a second shift position and is an axial position at which axial movement of the shift actuator in an opposite direction is blocked; and
- both of the radially outer exterior teeth of the first and the second transmission gears being engaged, in a central position of the shift actuator, respectively, by the radially inner claw teeth of the first and the second shifting sleeve halves, and in the central position of the shift actuator, the radially inner claw teeth of the first and the second shifting sleeve halves engage a synchronizer element, and the central position corresponds to a third shift position, and
- only one of the first and the second shifting sleeve halves abut the shift actuator when the shift actuator is in either the first or the second axial end positions.

\* \* \* \* \*